(12) United States Patent
Kim

(10) Patent No.: US 12,043,310 B2
(45) Date of Patent: Jul. 23, 2024

(54) DRIVER ASSISTANCE SYSTEM AND CONTROL METHOD FOR THE SAME

(71) Applicant: HL KLEMOVE CORP., Incheon (KR)

(72) Inventor: Soontae Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 281 days.

(21) Appl. No.: 17/586,563

(22) Filed: Jan. 27, 2022

(65) Prior Publication Data

US 2022/0242485 A1  Aug. 4, 2022

(30) Foreign Application Priority Data

Feb. 1, 2021 (KR) .......................... 10-2021-0014124

(51) Int. Cl.
| | | |
|---|---|---|
| *B62D 15/02* | (2006.01) | |
| *B60Q 9/00* | (2006.01) | |
| *G06V 20/56* | (2022.01) | |
| *G06V 20/58* | (2022.01) | |
| *G08G 1/16* | (2006.01) | |

(52) U.S. Cl.
CPC .......... *B62D 15/029* (2013.01); *B60Q 9/008* (2013.01); *G06V 20/58* (2022.01); *G06V 20/588* (2022.01); *G08G 1/167* (2013.01)

(58) Field of Classification Search
CPC .... B62D 15/029; G06V 20/58; G06V 20/588; B60Q 9/008; G08G 1/167
See application file for complete search history.

(56) References Cited

U.S. PATENT DOCUMENTS

2021/0276484 A1*  9/2021  Kim .......................... B60Q 9/00

FOREIGN PATENT DOCUMENTS

| KR | 10-1794430 | 11/2017 |
|---|---|---|
| KR | 10-1885424 | 8/2018 |

* cited by examiner

*Primary Examiner* — Jacob M Amick
(74) *Attorney, Agent, or Firm* — Womble Bond Dickinson (US) LLP

(57) ABSTRACT

Provided is a driver assistance system including: a camera provided in a vehicle to have an outside field of view of the vehicle and acquire image data; a radar provided in the vehicle to have an outside field of sensing of the vehicle and acquire radar data; and a controller comprising at least one processor configured to process the image data acquired by the camera and the radar data acquired by the radar, wherein the controller is configured to: transmit a steering signal to the vehicle for a lane following assist based on at least one of the image data or the radar data, detect a driver's operation of a steering device based on the steering signal and a steering angle of the steering device, transmit a warning signal to the vehicle to output a warning in stages with time when the driver's operation is not detected, and when determining as an unsuitable state for assistance based on at least one of the image data or the radar data, transmit the warning signal to output a higher level warning.

20 Claims, 14 Drawing Sheets

DRIVER ASSISTANCE SYSTEM AND CONTROL METHOD FOR THE SAME

CROSS-REFERENCE TO RELATED APPLICATION

This application is based on and claims priority under 35 U.S.C. § 119 to Korean Patent Application No. 10-2021-0014124, filed on Feb. 1, 2021 in the Korean Intellectual Property Office, the disclosure of which is incorporated herein by reference.

BACKGROUND

1. Technical Field

The disclosure relates to a driver assistance system.

2. Background Art

A lot of research on vehicles equipped with advanced driver assistance systems (ADAS) that actively provide information about a vehicle state, a driver state and traffic environment has been recently carried out to reduce drivers' burden and improve convenience.

As an example of an ADAS mounted on a vehicle, a lane following assist (LFA) may plan a driving path and control the vehicle to track the desired path using an active control of an electronic power steering (EPS) to provide convenience to a driver.

That is, the lane following assist is a system capable of controlling the vehicle or providing a warning to keep the vehicle within its lane during driving. However, in a hands-off situation where a driver does not hold a steering wheel and when the lane following assist is unsuitable to be performed, the likelihood of an accident may increase.

SUMMARY

An aspect of the disclosure provides a driver assistance system and a control method thereof that may output a warning in stages with time when no driver's steering wheel operation is detected while a lane following assist (LFA) is performed, and immediately output a higher level warning, when an unsuitable state for assistance is determined.

Additional aspects of the disclosure will be set forth in part in the description which follows and, in part, will be obvious from the description, or may be learned by practice of the disclosure.

According to an aspect of the disclosure, there is provided a driver assistance system, including: a camera provided in a vehicle to have an outside field of view of the vehicle and acquire image data; a radar provided in the vehicle to have an outside field of sensing of the vehicle and acquire radar data; and a controller including at least one processor configured to process the image data acquired by the camera and the radar data acquired by the radar, wherein the controller is configured to: transmit a steering signal to the vehicle for a lane following assist based on at least one of the image data or the radar data, detect a driver's operation of a steering device based on the steering signal and a steering angle of the steering device, transmit a warning signal to the vehicle to output a warning in stages with time when the driver's operation is not detected, and when determining as an unsuitable state for assistance based on at least one of the image data or the radar data, transmit the warning signal to output a higher level warning.

The controller is configured to transmit a first warning signal to the vehicle so that when the driver's operation is not detected for a first period of time, a hands-off state is determined and a lower level warning is output, and transmit a second warning signal to the vehicle so that the higher level warning is output when the driver's operation is not detected for a second period of time after outputting the lower level warning.

The lower level warning is a visual warning, and the higher level warning is at least one of an audible warning or an audiovisual warning.

The controller is configured to transmit the warning signal to the vehicle so that the higher level warning is immediately output, when determining as the unsuitable state for assistance before an elapse of the first period of time, or before an elapse of the second period of time after outputting the lower level warning.

The controller is configured to determine as the unsuitable state for assistance, when at least one of a state of deviation from a control condition for the lane following assist or a collision risk state occurs.

The controller is configured to determine as the state of deviation from the control condition for the lane following assist, when a lane disappears while performing the lane following assist by identifying the lane.

The controller is configured to determine as the collision risk state, when a risk of collision with a nearby object exists based on a relative location to the nearby object.

The controller is configured to determine as the unsuitable state for assistance, when a preceding vehicle changes lanes, while performing the lane following assist by following the preceding vehicle.

The controller is configured to determine as the unsuitable state for assistance, when the vehicle reaches a branching point where a lane width is widened while performing the lane following assist by identifying the lane, and the branching point is a critical point in a branching section where the lane width reaches a preset value.

The controller is configured to determine as the unsuitable state for assistance, when the vehicle reaches a joining point where a lane width becomes narrow while performing the lane following assist by identifying the lane, and the joining point is a critical point in a joining section where the lane width reaches a preset value.

According to an aspect of the disclosure, there is provided a control method of a driver assistance system including a camera provided in a vehicle to have an outside field of view of the vehicle and acquire image data and a radar provided in the vehicle to have an outside field of sensing of the vehicle and acquire radar data, the control method including: transmitting a steering signal to the vehicle for a lane following assist based on at least one of the image data or the radar data; detecting a driver's operation of a steering device based on the steering signal and a steering angle of the steering device; transmitting a warning signal to the vehicle to output a warning in stages with time when the driver's operation is not detected; and when determining as an unsuitable state for assistance based on at least one of the image data or the radar data, transmitting the warning signal to output a higher level warning.

The transmitting of the warning signal to the vehicle to output the warning in stages with time when the driver's operation is not detected includes: when the driver's operation is not detected for a first period of time, transmitting a first warning signal to the vehicle so that a hands-off state is determined and a lower level warning is output, and when the driver's operation is not detected for a second period of time after outputting the lower level warning, transmitting a second warning signal to the vehicle so that the higher level warning is output.

The lower level warning is a visual warning, and the higher level warning is at least one of an audible warning or an audiovisual warning.

The transmitting of the warning signal to the vehicle to output the higher level warning includes transmitting the warning signal to the vehicle so that the higher level warning is immediately output, when determining as the unsuitable state for assistance before an elapse of the first period of time, or before an elapse of the second period of time after outputting the lower level warning.

The determining as the unsuitable state for assistance includes determining as the unsuitable state for assistance, when at least one of a state of deviation from a control condition for the lane following assist or a collision risk state occurs.

The determining as the unsuitable state for assistance includes determining as the state of deviation from the control condition for the lane following assist, when a lane disappears while performing the lane following assist by identifying the lane.

The determining as the unsuitable state for assistance includes determining as the collision risk state, when a risk of collision with a nearby object exists based on a relative location to the nearby object.

The determining as the unsuitable state for assistance includes determining as the unsuitable state for assistance, when a preceding vehicle changes lanes, while performing the lane following assist by following the preceding vehicle.

The determining as the unsuitable state for assistance includes determining as the unsuitable state for assistance, when the vehicle reaches a branching point where a lane width is widened while performing the lane following assist by identifying the lane, and the branching point is a critical point in a branching section where the lane width reaches a preset value.

The determining as the unsuitable state for assistance includes determining as the unsuitable state for assistance, when the vehicle reaches a joining point where a lane width becomes narrow while performing the lane following assist by identifying the lane, and the joining point is a critical point in a joining section where the lane width reaches a preset value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
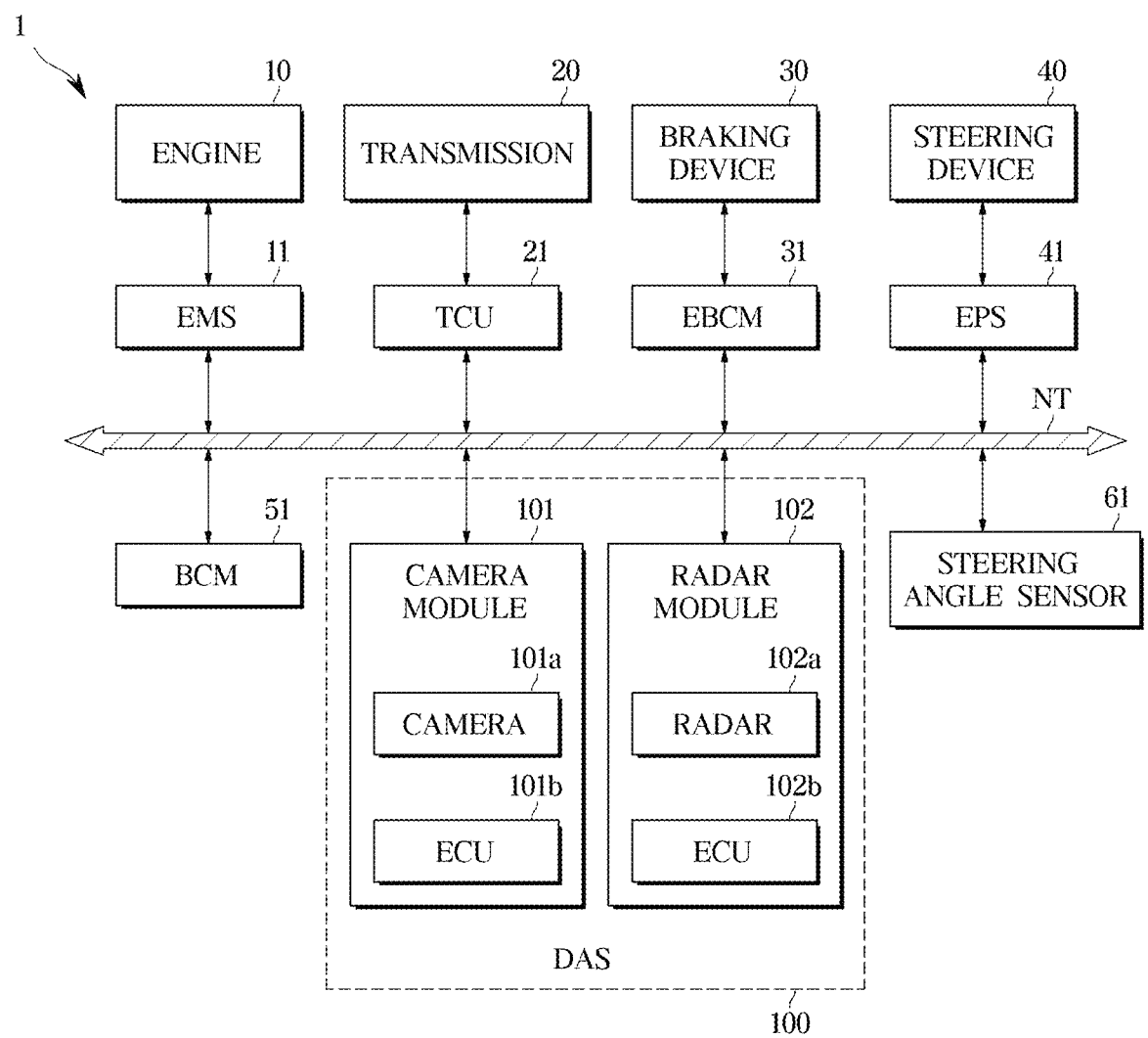
FIG. 1 illustrates a configuration of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle according to an embodiment.

As shown in FIG. 1, a vehicle 1 includes an engine 10, a transmission 20, a braking device 30, and a steering device 40. The engine 10 includes a cylinder and a piston, and may generate power for driving the vehicle 1. The transmission 20 includes a plurality of gears and may transmit the power generated by the engine 10 to vehicle wheels. The braking device 30 may decelerate or stop the vehicle 1 through friction with the vehicle wheels. The steering device 40 may change a driving direction of the vehicle 1.

However, the vehicle 1 is not limited to the above, and according to embodiments, may further include a motor (not shown) for transmitting power to the vehicle wheels in addition to the engine 10 and the transmission 20, or include only the motor without the engine 10 and the transmission 20.

The vehicle 1 may include a plurality of electronic components. For example, the vehicle 1 may further include an engine management system (EMS) 11, a transmission control unit (TCU) 21, an electronic brake control module (EBCM) 31, an electronic power steering (EPS) 41, a body control module (BCM) 51, a steering angle sensor 61 for detecting a steering angle of a steering wheel, and a driver assistance system (DAS) 100.

The EMS 11 may control the engine 10 in response to a driver's acceleration intention through an accelerator pedal or a request from the DAS 100. For instance, the EMS 11 may control a torque of the engine 10.

The TCU 21 may control the transmission 20 in response to a driver's shift command through a shift lever and/or a driving speed of the vehicle 1. For example, the TCU 21 may adjust a shift ratio from the engine 10 to the vehicle wheels.

However, as described above, according to embodiments, the vehicle 1 may be a hybrid vehicle further including the motor, or an electric vehicle including the motor only. Therefore, according to embodiments, the EMS 11 and the TCU 21 may be omitted.

The EBCM 31 may control the braking device 30 in response to a driver's braking intention through a brake pedal and/or wheel slip. For example, the EBCM 31 may temporarily release the wheel braking in response to the wheel slip detected when braking the vehicle 1 (anti-lock braking system, ABS). The EBCM 31 may selectively release the wheel braking in response to oversteering and/or understeering detected when steering the vehicle 1 (electronic stability control, ESC). Also, the EBCM 31 may temporarily brake the wheels in response to the wheel slip detected when driving the vehicle 1 (traction control system, TCS).

The EPS 41 may assist operations of the steering device 40 so that a driver may easily manipulate a steering wheel according to a driver's steering intention. For instance, the EPS 41 may assist the operations of the steering device 40 to decrease a steering force when driving at a low speed or when parking, and increase a steering force when driving at a high speed.

The BCM 51 may control operations of electronic components that provide convenience to the driver or secure the driver safety. For example, the BCM 51 may control a head lamp, a wiper, a cluster, a multifunction switch, a turn signal, and the like.

The steering angle sensor 61 may detect the steering angle of the steering device 40 and whether the steering wheel is manipulated by the driver. To this end, the steering angle sensor 61 may be a torque sensor provided in one side of the steering device 40 and capable of detecting whether the steering wheel is manipulated by the driver by detecting a torque applied to the steering device 40.

The DAS 100 may assist the driver's operation (driving, braking, and steering). For instance, the DAS 100 may detect an environment (e.g., other vehicles, pedestrians, cyclists, lanes, road signs, etc.) in which the vehicle 1 is travelling, and control driving and/or braking and/or steering of the vehicle 1 in response to the detected environment.

The DAS 100 may provide the driver with a variety of functions. For example, the DAS 100 may provide functions such as a lane departure warning (LDW), a lane following assist (LFA), a blind spot detection (BSD), a lane change assist (LCA), a high beam assist (HBA), an autonomous emergency braking (AEB), a traffic sign recognition (TSR), a smart cruise control (SCC), and the like.

The DAS 100 may include a camera module 101 that acquires image data around the vehicle 1 and a radar module 102 that acquires data about objects around the vehicle 1. The camera module 101 includes a camera 101a and an electronic control unit (ECU) 101b, and may photograph a front of the vehicle 1 and recognize other vehicles, pedestrians, cyclists, lanes, road signs, etc. The radar module 102 includes a radar 102a and an ECU 102b, and may acquire a relative location, a relative speed, etc., of the objects (e.g., other vehicles, pedestrians, cyclists, etc.) around the vehicle 1.

The DAS 100 is not limited to that illustrated in FIG. 1, and may further include a light detection and ranging (lidar) that detects an object around the vehicle 1 by scanning around the vehicle 1, an infrared sensor, and the like.

The above-described electronic components may communicate with each other via a vehicle communication network (NT). For example, the electronic components may transmit/receive data through Ethernet, media oriented systems transport (MOST), FlexRay, controller area network (CAN), local interconnect network (LIN), and the like. For instance, the DAS 100 may transmit a driving control signal, a braking signal, and a steering signal to the EMS 11, the EBCM 31, and the EPS 41, respectively, through a vehicle communication network (NT). Also, the DAS 100 may receive steering angle information of the steering device 40 from the steering angle sensor 61 through the vehicle communication network.

Figure 2:
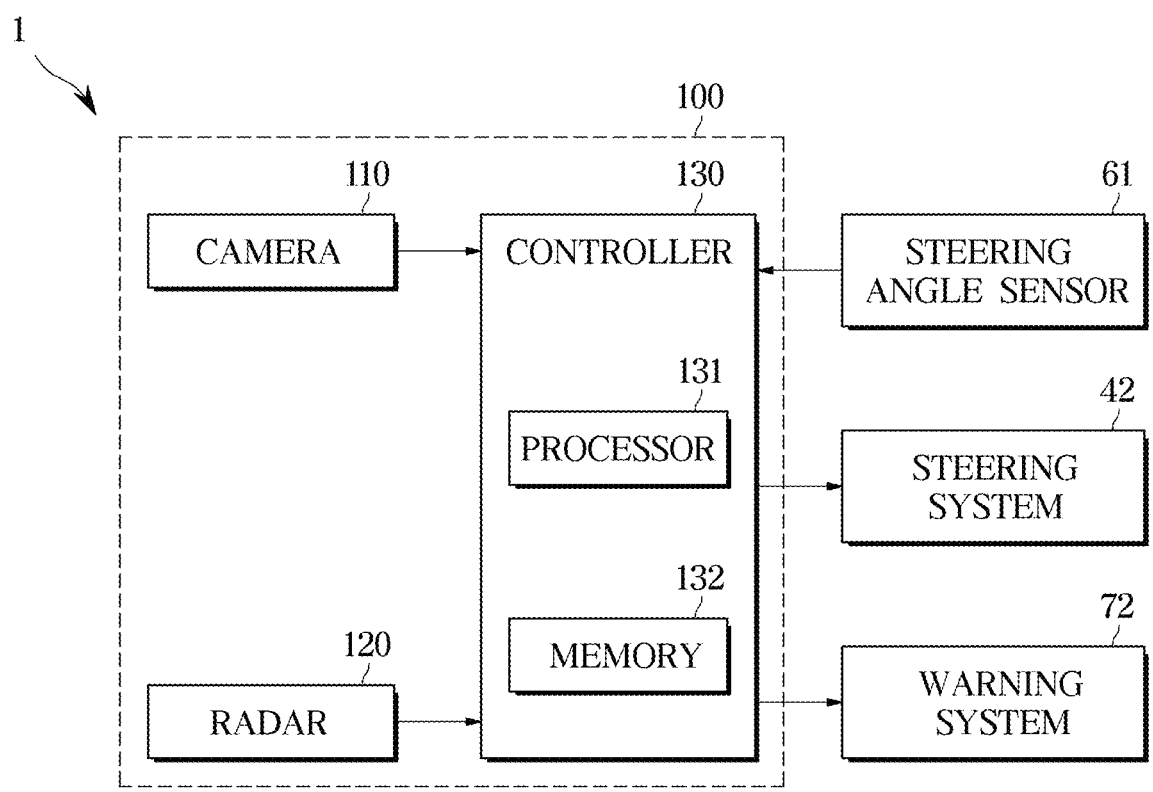
FIG. 2 illustrates a configuration of a driver assistance system according to an embodiment.

FIG. 2 illustrates a configuration of the DAS 100 according to an embodiment.

Figure 3:
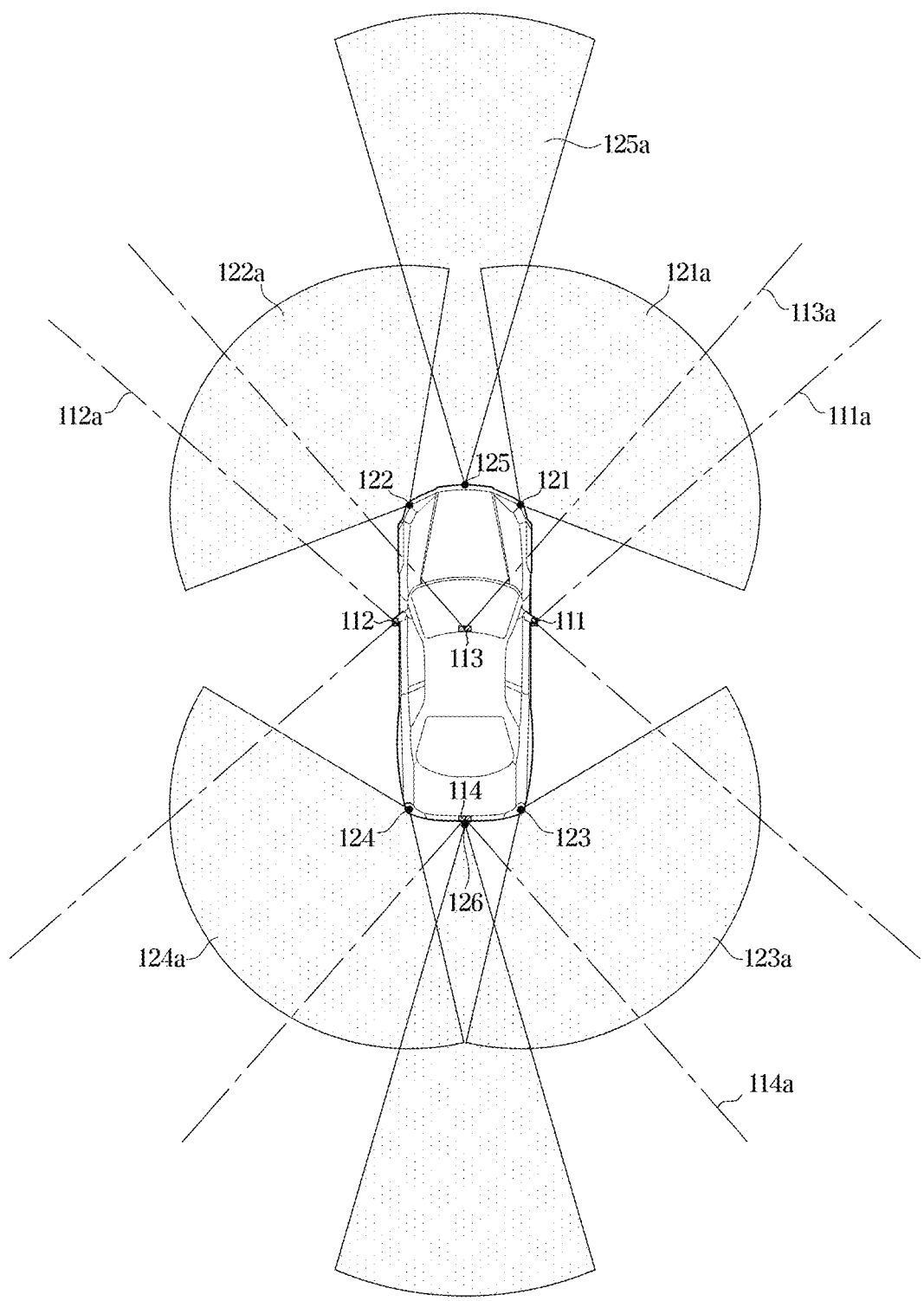
FIG. 3 illustrates a camera and a radar included in a driver assistance system according to an embodiment.

FIG. 3 illustrates a camera and a radar included in the DAS 100 according to an embodiment.

As shown in FIG. 2, the vehicle 1 may include the steering angle sensor 61, a steering system 42, a warning system 72, and the DAS 100.

The steering angle sensor 61 may detect steering angle information of the steering device 40 and provide the steering angle information to the DAS 100. The steering system 42 may include the EPS 41 (refer to FIG. 1) and the steering device 40 (refer to FIG. 1).

The warning system 72 may provide a driver with a warning based on a warning signal received from the DAS 100 through the vehicle communication network (NT).

To this end, the warning system 72 may include a processor, a speaker for providing a warning sound to the driver based on the warning signal, and a display for displaying a warning message to the driver based on the warning signal. The speaker and the display may be provided in the vehicle 1 to provide a warning to the driver.

Also, the warning system 72 may include warning indicators provided on each of a left side mirror and a right side mirror. A warning indicator in the side mirror on a side where a dangerous situation is predicted to occur lights up, thereby may provide the driver with a directional warning.

The DAS 100 may include a camera 110 and a radar 120.

As shown in FIG. 3, the camera 110 may have fields of view 111*a*, 112*a*, 113*a* and 114*a* facing an outside of the vehicle 1.

To this end, the camera 110 includes a right camera 111 acquiring image data on a right side, a left camera 112 acquiring image data on a left side, a front camera 113 acquiring image data on a front side, and a rear camera 114 acquiring image data on a rear side.

For example, the right camera 111 and the left camera 112 may be provided in a right side mirror and a left side mirror, respectively.

For example, the front camera 113 may be installed on a front windshield of the vehicle 1, and the rear camera 114 may be installed on a trunk of the vehicle 1.

However, an installation position and the number of each camera 110 are not limited to the above, and may be varied according to embodiments.

The camera 110 may photograph an outside of the vehicle 1 and acquire image data on the outside of the vehicle 1. The image data on the outside of the vehicle 1 may include locations of other vehicles, pedestrians, cyclists, or lanes located outside the vehicle 1.

The camera 110 may include a plurality of lens and image sensors. The image sensors may include a plurality of photodiodes converting light into an electrical signal, and the plurality of photodiodes may be arranged in a two-dimensional (2D) matrix.

The camera 110 may be electrically connected to the controller 130. For instance, the camera 110 may be connected to the controller 130 via a vehicle communication network (NT), a hard wire, or a printed circuit board (PCB).

The camera 110 may transmit the image data of the outside of the vehicle 1 to the controller 130.

As shown in FIG. 3, the radar 120 may include corner radars 121, 122, 123 and 124 provided at the corners of the vehicle 1, a front radar 125 having a field of sensing facing the front of the vehicle 1, and a rear radar 126 having a field of sensing facing the rear of the vehicle 1.

The plurality of corner radars 121, 122, 123 and 124 include a first corner radar 121 installed on a front right side of the vehicle 1, a second corner radar 122 installed on a front left side of the vehicle 1, a third corner radar 123 installed on a rear right side of the vehicle 1, and a fourth corner radar 124 installed on a rear left side of the vehicle 1.

As shown in FIG. 3, the first corner radar 121 may have a field of sensing 121*a* facing the front right side of the vehicle 1. The second corner radar 122 may have a field of sensing 122*a* facing the front left side of the vehicle 1, and may be installed on a left side of a front bumper of the vehicle 1. The third corner radar 123 may have a field of sensing 123*a* facing the rear right side of the vehicle 1, and may be installed on a right side of a rear bumper of the vehicle 1. The fourth corner radar 124 may have a field of sensing 124*a* facing the rear left side of the vehicle 1, and may be installed on a left side of the rear bumper of the vehicle 1.

Each of the first to fourth corner radars 121, 122, 123 and 124 may include a transmission antenna and a receiving antenna. The first to fourth corner radars 121, 122, 123 and 124 may acquire first corner radar data, second corner radar data, third corner radar data and fourth corner radar data, respectively. The first corner radar data may include distance information and speed information about other vehicles, pedestrians or cyclists (hereinafter, referred to as "object") located in the front right side of the vehicle 1. The second corner radar data may include distance information and speed information about an object located in the front left side of the vehicle 1. The third corner radar data and the fourth corner radar data may include distance information and relative speed of an object located in the rear right and rear left sides of the vehicle 1, respectively.

For instance, each of the first to fourth corner radars 121, 122, 123 and 124 may be electrically connected to the controller 130 via a vehicle communication network (NT), a hard wire, or a PCB. The first to fourth corner radars 121, 122, 123 and 124 may transmit the first to fourth corner radar data to the controller 130, respectively.

For example, the front radar 125 may be installed on the right side of the front bumper of the vehicle 1.

As shown in FIG. 3, the front radar 125 may have a field of sensing 125*a* facing the front of the vehicle 1. For example, the front radar 125 may be installed in a grille or a bumper of the vehicle 1.

The front radar 125 may include a transmission antenna (or a transmission antenna array) that transmits a transmission wave toward the front of the vehicle 1, and a receiving antenna (or a receiving antenna array) that receives a reflected wave reflected from an object. The front radar 125 may acquire front radar data from the transmission wave transmitted by the transmission antenna and the reflected wave received by the receiving antenna. The front radar data may include distance information and speed information about other vehicles, pedestrians or cyclists located in front of the vehicle 1. The front radar 125 may calculate a relative distance to an object based on a phase difference (or a time difference) between the transmission wave and the reflected wave, and calculate a relative speed of the object based on a frequency difference between the transmission wave and the reflected wave.

For instance, the front radar 125 may be connected to the controller 130 via a vehicle communication network (NT), a hard wire, or a PCB. The front radar 125 may transmit the front radar data to the controller 130.

The rear radar 126 may acquire rear radar data about the rear of the vehicle 1 and be provided in the bumper of the vehicle 1.

The controller 130 may include the ECU 101*b* (refer to FIG. 1) of the camera module 101 (refer to FIG. 1), and/or the ECU 102*b* (refer to FIG. 1) of the radar module 102 (refer to FIG. 1), and/or a separate integrated controller.

The controller 130 may include a processor 131 and a memory 132.

The processor 131 may process the image data of the camera 110, the radar data of the radar 120 and steering angle information of the steering angle sensor 61, and generate a steering signal and a warning signal for controlling the steering system 42 and the warning system 72, respectively. For example, the processor 131 may include an image processor for processing the image data of the camera 110, and/or a digital signal processor for processing the radar data of the radar 120, and/or a micro control unit (MCU) for generating the steering signal and the warning signal.

The processor 131 may transmit to the vehicle 1 the steering signal for lane following assist, based on at least one of the image data of the camera 110 or the radar data of the radar 120.

Specifically, the processor 131 may identify lanes or a preceding vehicle based on at least one of the image data or the radar data, determine a target path based on the identified lanes or preceding vehicle, and transmit the steering signal to the steering system 42 to track the target path.

For instance, when lanes are identified, the processor 131 may determine the target path for keeping the vehicle 1 centered in a lane. Also, when travelling in a lane disappearing section such as an intersection, etc., while the lane following assist is performed, the processor 131 may determine the target path for following the preceding vehicle.

The processor 131 may transmit the steering signal to the steering system 42 so that the vehicle 1 may travel along the target path. The EPS 41 of the steering system 42 may control the steering device 40 based on the steering signal received from the DAS 100, allowing the vehicle 1 to travel along the target path.

The processor 131 may determine a steering angle of the steering device 40 based on an output of the steering angle sensor 61. In this instance, the steering angle of the steering device 40 may correspond to a steering angle of a steering wheel.

The processor 131 may detect a driver's operation of the steering device 40 based on the steering signal and the steering angle of the steering device 40.

Specifically, the processor 131 may determine the steering angle and a steering angle change speed of the steering device 40 based on the output of the steering angle sensor 61. When each of the steering angle and the steering angle change speed is maintained within a preset range for a preset period of time, the processor 131 may determine as a hands-off state where the driver's operation of the steering device 40 is not detected.

In this instance, the processor 131 may adjust a setting range corresponding to each of the steering angle and the steering angle change speed based on the steering signal for lane following assist. That is, the processor 131 may set a range for determining the driver's operation based on the steering angle and the steering angle change speed by the steering signal.

The processor 131 may transmit a warning signal to the vehicle 1 to output a warning about the hands-off state in stages with time when the driver's operation of the steering device 40 is not detected.

For example, when the driver's operation is not detected until a first period of time has elapsed after determining the hands-off state, the processor 131 may generate a first warning signal to output a lower level (first) warning. Also, when the driver's operation is not detected until a second period of time has elapsed after the output of the lower level warning, the processor 131 may generate a second warning signal to output a higher level (second) warning.

In this instance, the lower level warning may be a visual warning, and the higher level warning may be at least one of an audible warning or an audiovisual warning. That is, the processor 131 may generate the first warning signal targeted to a display so that the display of the warning system 72 outputs a warning, and generate the second warning signal targeted to a speaker so that the speaker of the warning system 72 outputs a warning. According to embodiments, a signal targeted to the display may be included in the second warning signal.

In this instance, the processor 131 may transmit a third warning signal to the vehicle 1 in order to warn that a system for lane following assist may be released when a third period of time elapses after the output of the higher level warning. Also, when a fourth period of time elapses after the warning according to the third warning signal, the processor 131 may turn off a function of lane following assist.

In addition, the processor 131 may output the warning about the hands-off state in stages with time when the driver's operation of the steering device 40 is not detected, and also when determining as an unsuitable state for assistance based on at least one of the image data or the radar data, transmit the second warning signal to the vehicle 1 in order to immediately output the higher level (second) warning.

That is, when determining as the unsuitable state for assistance before an elapse of the first period of time after determining the hands-off state, or before an elapse of the second period of time after the output of the lower level (first) warning, the processor 131 may transmit the warning signal to the vehicle 1 in order to immediately output the higher level (second) warning.

In other words, when at least one of a collision risk state or a state of deviation from a control condition for lane following assist occurs, the processor 131 may determine that the lane following assist is not suitable to be performed, determine the corresponding point in time as the unsuitable state for assistance, and transmit the warning signal in order to immediately output the higher level (second) warning.

The processor 131 may determine as the state of deviation from the control condition for lane following assist, when a lane disappears while performing the lane following assist by identifying the lane.

Also, the processor 131 may determine a relative location to a nearby object (e.g., other vehicles, pedestrians, cyclists, etc.) based on at least one of the image data or the radar data, and determine as the collision risk state when a risk of collision with the nearby object exists based on the relative location to the nearby object. That is, the processor 131 may calculate a time to collision (TTC) or a distance to collision (DTC) with the nearby object based on at least one of the image data or the radar data, and determine whether the risk of collision exists through comparison with a reference value.

Also, the processor 131 may determine as the unsuitable state for assistance, when a preceding vehicle changes lanes while performing the lane following assist by following the preceding vehicle. That is, when the preceding vehicle turns more than a preset angle, the processor 131 may determine that the preceding vehicle changes lanes, determine as the state of deviation from the control condition for lane following assist or the collision risk state due to the lane change of the preceding vehicle, and determine as the unsuitable state for assistance.

Further, when the vehicle 1 reaches a branching point where a lane width is widened while performing the lane following assist by identifying the lane, the processor 131 may determine as the state of deviation from the control condition for lane following assist or the collision risk state, and determine as the unsuitable state for assistance.

In addition, when the vehicle 1 reaches a joining point where a lane width becomes narrow while performing the lane following assist by identifying the lane, the processor 131 may determine as the state of deviation from the control condition for lane following assist or the collision risk state, and determine as the unsuitable state for assistance.

The memory 132 may store a program and/or data for the processor 131 to process the image data, a program and/or data for the processor 131 to process the radar data, and a program and/or data for processor 131 to generate the steering signal and/or the warning signal.

The memory 132 may temporarily store the image data received from the camera 110 and/or the radar data received from the radar 120. Also, the memory 132 may temporarily store a processing result of the image data and/or the radar data by the processor 131.

The memory 132 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The DAS 100 is not limited to that illustrated in FIG. 2, and may further include a lidar, an infrared sensor, etc., for detecting external objects such as lanes, preceding vehicles, and the like, by scanning around the vehicle 1.

A configuration of the DAS 100 has been described above. Hereinafter, the DAS 100 performing the lane following assist is described in detail.

Figure 4:
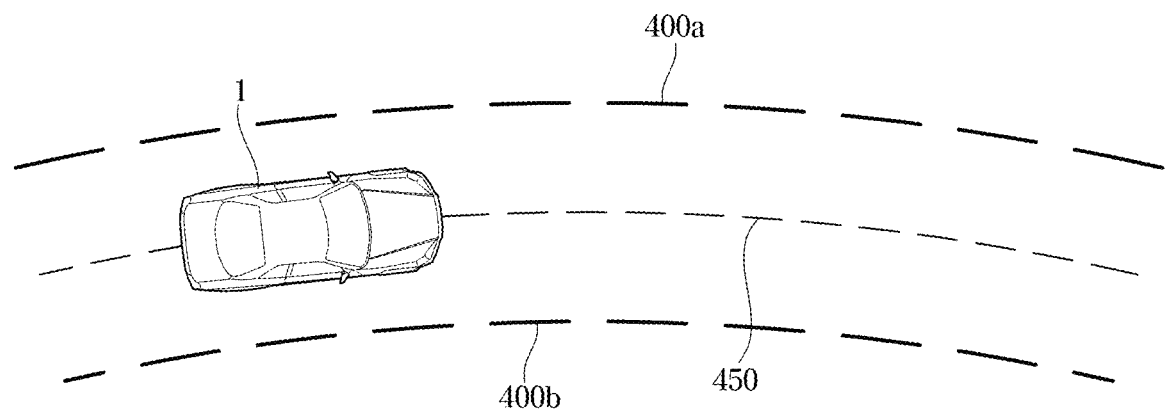
FIG. 4 is a diagram illustrating an example where a driver assistance system according to an embodiment identifies lanes to perform a lane following assist.
Figure 5:
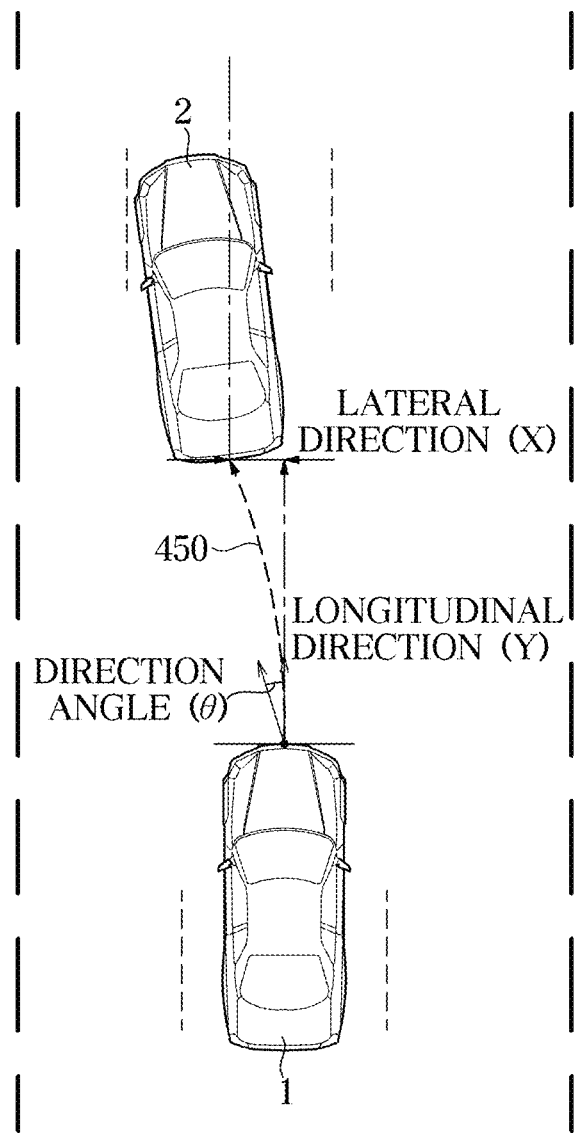
FIG. 5 is a diagram illustrating an example where a driver assistance system according to an embodiment follows a preceding vehicle to perform the lane following assist.

FIG. 4 is a diagram illustrating an example where the DAS 100 according to an embodiment identifies lanes to perform a lane following assist. FIG. 5 is a diagram illustrating an example where the DAS 100 according to an embodiment follows a preceding vehicle to perform the lane following assist.

Referring to FIGS. 4 and 5, the processor 131 may transmit a steering signal to the vehicle 1 for the lane following assist, based on at least one of image data of the camera 110 or radar data of the radar 120.

Specifically, the processor 131 may identify lanes 400 or a preceding vehicle 2 based on at least one of the image data or the radar data, determine a target path 450 based on the identified lanes 400 or the identified preceding vehicle 2, and transmit the steering signal to the steering system 42 to follow the target path 450.

For example, when the lanes 400 are identified, the processor 131 may determine the target path 450 for keeping the vehicle 1 centered in a lane. That is, the processor 131 may determine a center of a lane formed by a first lane 400a on the left side of the vehicle 1 and a second lane 400b on the right side of the vehicle 1 as the target path 450.

Also, when travelling in a lane disappearing section such as an intersection, etc., while the lane following assist is performed, the processor 131 may determine the target path 450 for following the preceding vehicle 2. Specifically, the processor 131 may determine a relative location to the preceding vehicle 2 by determining a lateral distance x, a longitudinal distance y, and a direction angel θ between the preceding vehicle 2 and the vehicle 1 based on at least one of the image data or the radar data, and also determine a path for following the preceding vehicle 2 as the target path 450.

The processor 131 may transmit the steering signal to the steering system 42 so that the vehicle 1 may travel along the target path 450. The EPS 41 of the steering system 42 may control the steering device 40 based on the steering signal received from the DAS 100, allowing the vehicle 1 to travel along the target path 450.

The DAS 100 performing the lane following assist has been described above. Hereinafter, the DAS 100 detecting a driver's operation of the steering device 40, determining a hands-off state and providing a warning is described in detail.

Figure 6:
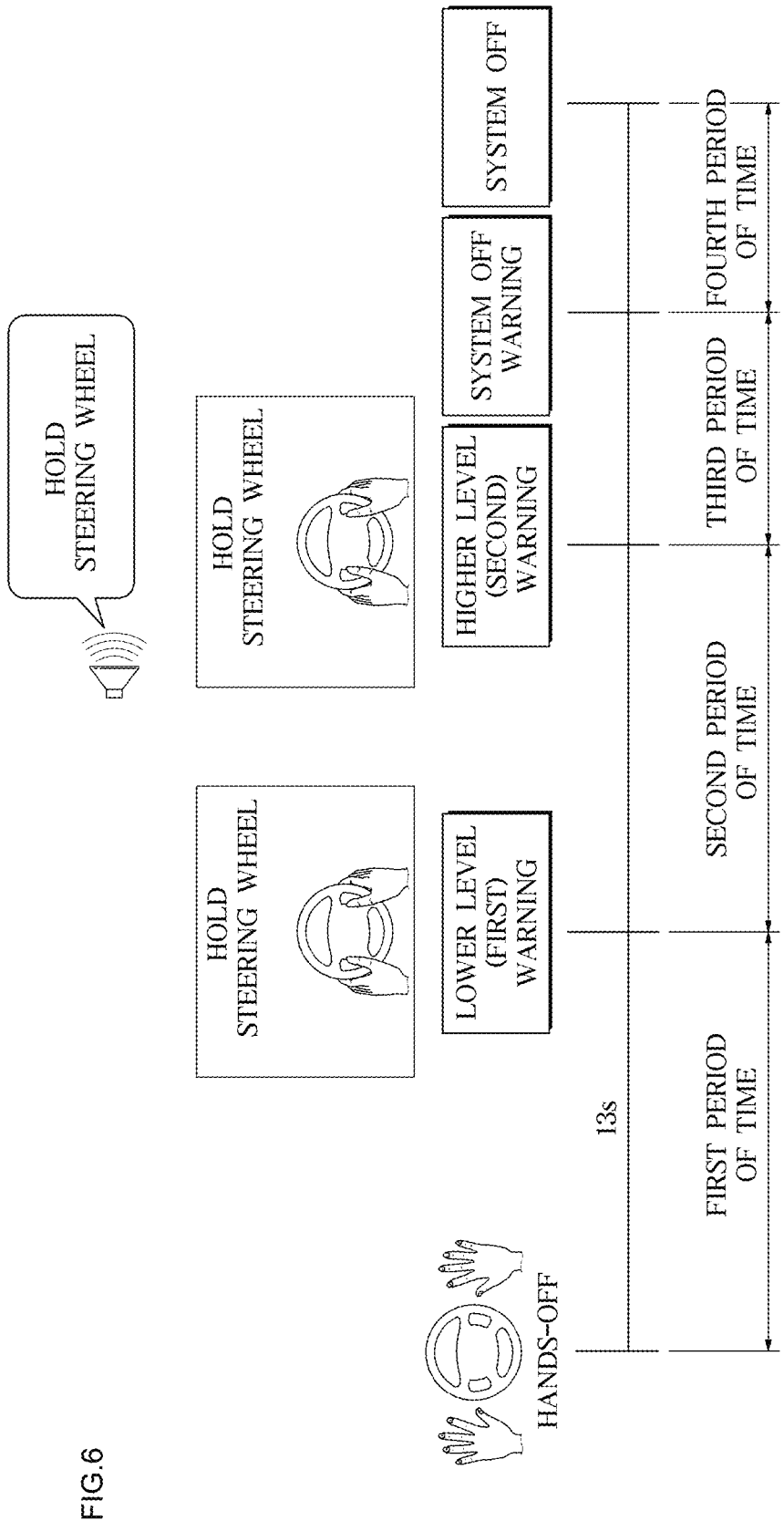
FIG. 6 is a diagram illustrating an example where a driver assistance system according to an embodiment detects a hands-off state and provides a warning in stages.
Figure 7:
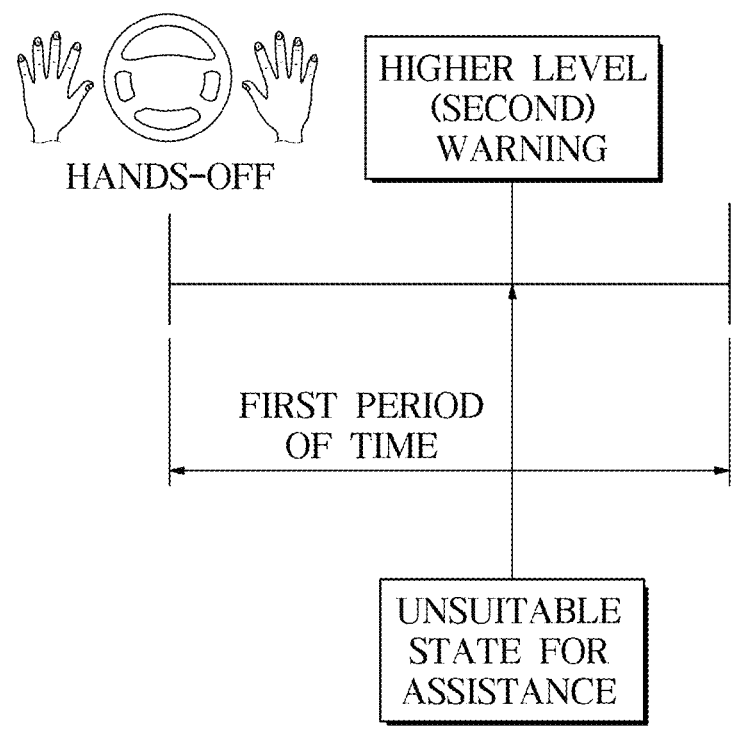
FIG. 7 is a diagram illustrating an example where a driver assistance system according to an embodiment detects an unsuitable state for assistance and provides a warning.
Figure 8:
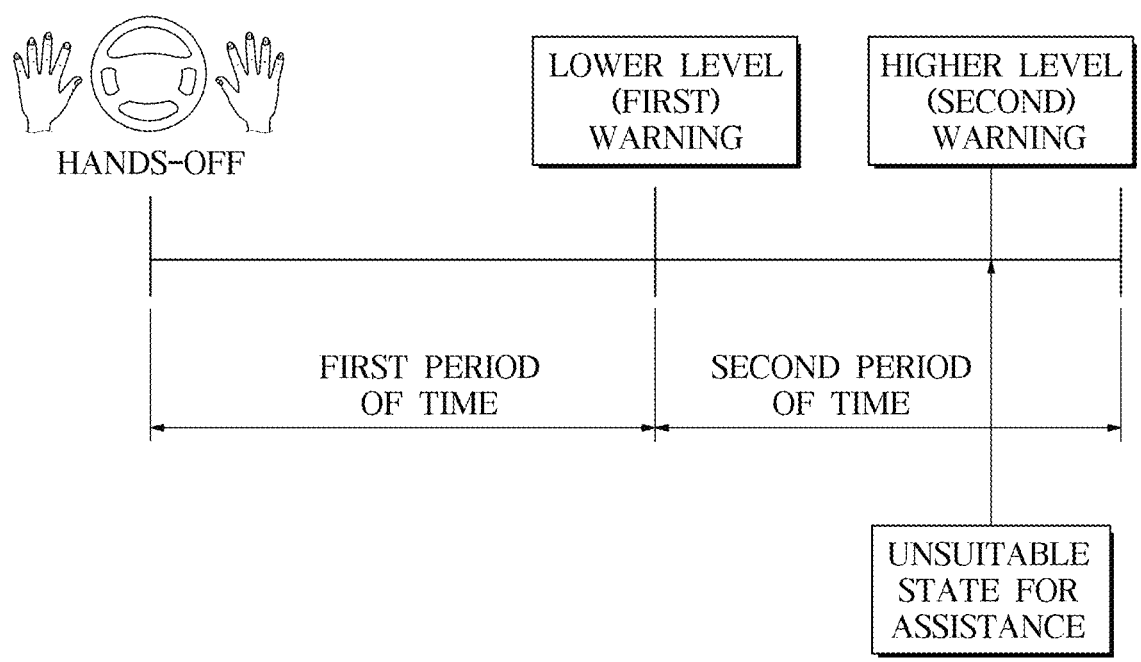
FIG. 8 is a diagram illustrating an example where a driver assistance system according to an embodiment detects a hands-off state and provides a warning in stages.

FIG. 6 is a diagram illustrating an example where the DAS 100 according to an embodiment detects a hands-off state and provides a warning in stages. FIG. 7 is a diagram illustrating an example where the DAS 100 according to an embodiment detects an unsuitable state for assistance and provides a warning. FIG. 8 is a diagram illustrating an example where the DAS 100 according to an embodiment detects a hands-off state and provides a warning in stages.

Referring to FIG. 6, the processor 131 may determine a steering angle of the steering device 40 based on an output of the steering angle sensor 61. In this instance, the steering angle of the steering device 40 may correspond to a steering angle of a steering wheel.

Specifically, the processor 131 may determine the steering angle and a steering angle change speed of the steering device 40 based on the output of the steering angle sensor 61. When each of the steering angle and the steering angle change speed is maintained within a preset range for a preset period of time, the processor 131 may determine as a hands-off state where the driver's operation of the steering device 40 is not detected.

In this instance, the processor 131 may adjust a setting range corresponding to each of the steering angle and the steering angle change speed based on the steering signal for lane following assist. That is, the processor 131 may set a range for determining the driver's operation based on the steering angle and the steering angle change speed by the steering signal.

As shown in FIG. 6, the processor 131 may transmit a warning signal to the vehicle 1 to output a warning about the hands-off state in stages with time when the driver's operation of the steering device 40 is not detected.

For example, when the driver's operation is not detected until a first period of time has elapsed after determining the hands-off state, the processor 131 may generate a first warning signal to output a lower level (first) warning. Also, when the driver's operation is not detected until a second period of time has elapsed after the output of the lower level warning, the processor 131 may generate a second warning signal to output a higher level (second) warning.

In this instance, the lower level warning may be a visual warning, and the higher level warning may be at least one of an audible warning or an audiovisual warning. For example, as the visual warning, a message ("hold a steering wheel") to warn a driver to hold the steering wheel may be displayed on a display, and as the audible warning, a message ("hold a steering wheel") to warn a driver to hold the steering wheel may be output through a speaker.

That is, the processor 131 may generate the first warning signal targeted to the display so that the display of the warning system 72 outputs a warning, and generate the second warning signal targeted to the speaker so that the speaker of the warning system 72 outputs a warning. According to embodiments, a signal targeted to the display may be included in the second warning signal.

In this instance, the processor 131 may transmit a third warning signal to the vehicle 1 in order to warn that a system for lane following assist may be released when a third period of time elapses after the output of the higher level warning. Also, when a fourth period of time elapses after the warning according to the third warning signal, the processor 131 may turn off a function of lane following assist to release the system for lane following assist.

As shown in FIGS. 7 and 8, the processor 131 may output the warning about the hands-off state in stages with time when the driver's operation of the steering device 40 is not detected, and also when determining as an unsuitable state for assistance based on at least one of the image data or the radar data, transmit the second warning signal to the vehicle 1 in order to immediately output the higher level (second) warning.

That is, as shown in FIG. 7, when determining as the unsuitable state for assistance before an elapse of the first period of time after determining the hands-off state, the processor 131 may transmit the warning signal to the vehicle 1 in order to immediately output the higher level (second) warning.

Also, as shown in FIG. 8, when determining as the unsuitable state for assistance before an elapse of the second period of time after the output of the lower level (first) warning, the processor 131 may transmit the warning signal to the vehicle 1 in order to immediately output the higher level (second) warning.

In other words, when at least one of a collision risk state or a state of deviation from a control condition for lane following assist occurs, the processor 131 may determine that the lane following assist is not suitable to be performed, determine the corresponding point in time as the unsuitable state for assistance, and transmit the warning signal in order to immediately output the higher level (second) warning.

The DAS 100 detecting the driver's operation of the steering device 40, determining the hands-off state and providing a warning has been described above. Hereinafter, the DAS 100 determining as the unsuitable state for assistance is described in detail.

Figure 9:
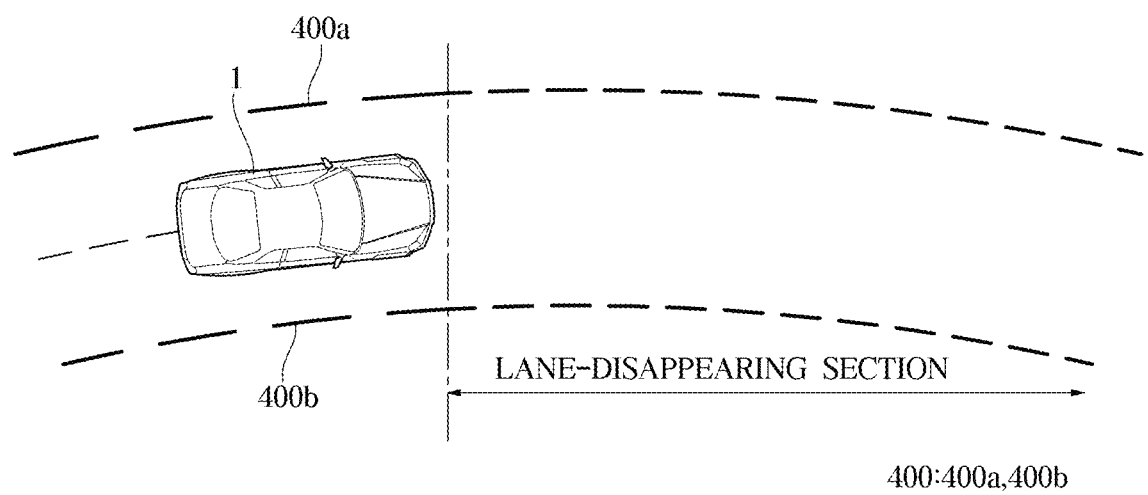
FIG. 9 is a diagram illustrating an example where a driver assistance system according to an embodiment determines as a state of deviation from a control condition for a lane following assist due to a lane disappearing.
Figure 10:
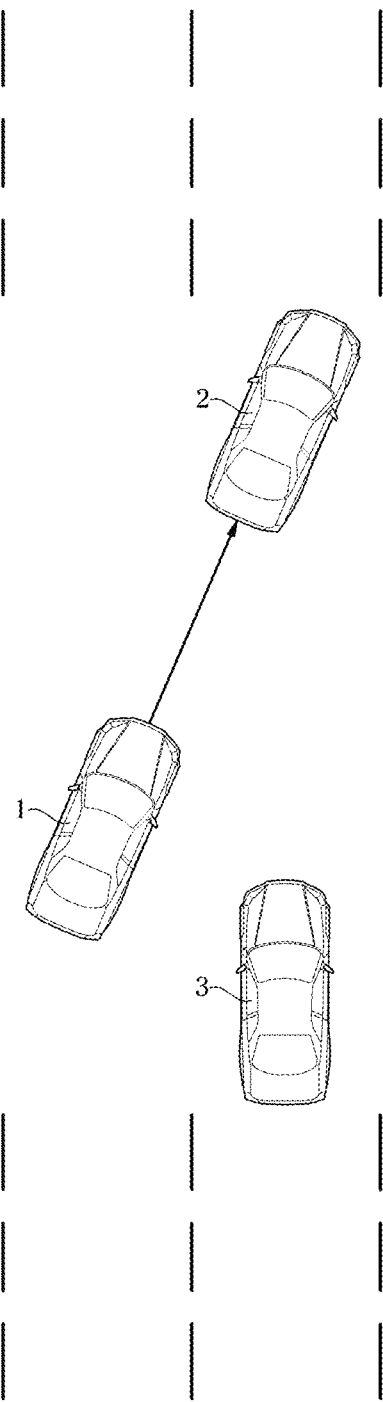
FIG. 10 is a diagram illustrating an example where a driver assistance system according to an embodiment determines as a collision risk state.
Figure 11:
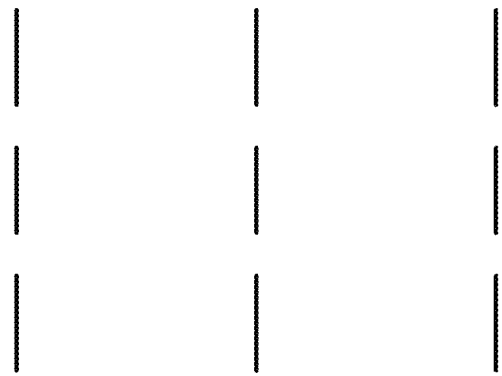
FIG. 11 is a diagram illustrating an example where a driver assistance system according to an embodiment determines as an unsuitable state for assistance due to a lane change of a preceding vehicle.
Figure 11:
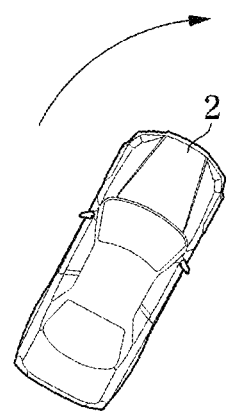
Figure 11:
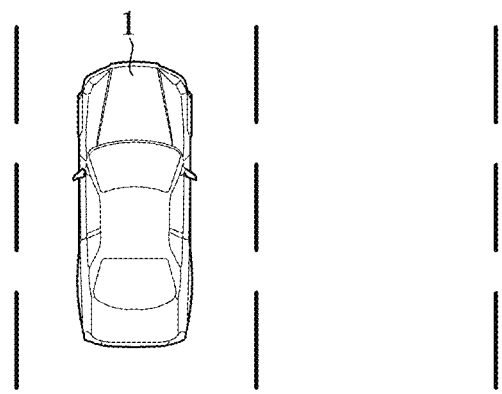
Figure 12:
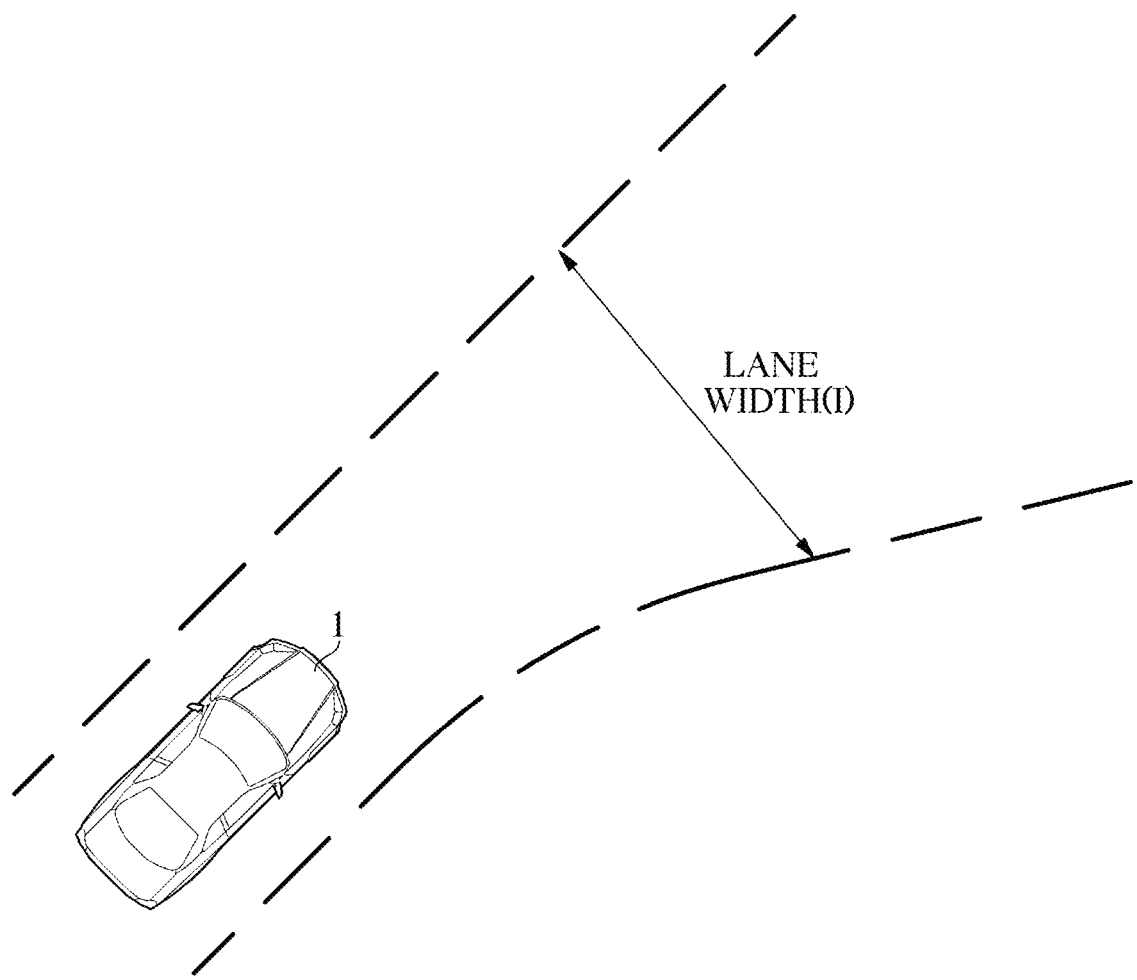
FIG. 12 is a diagram illustrating an example where a driver assistance system according to an embodiment determines as an unsuitable state for assistance due to reaching a branching point.
Figure 13:
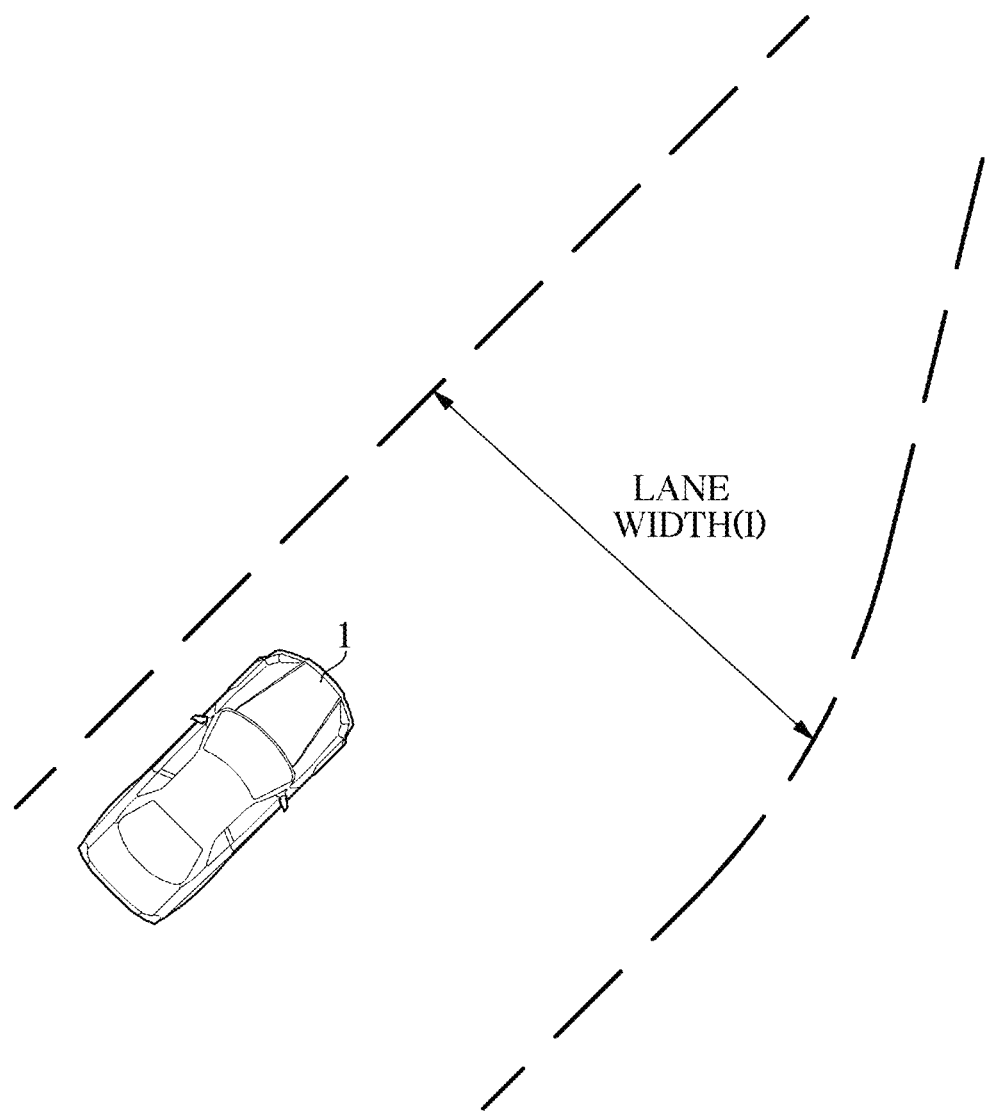
FIG. 13 is a diagram illustrating an example where a driver assistance system according to an embodiment determines as an unsuitable state for assistance due to reaching a joining point.

FIG. 9 is a diagram illustrating an example where the DAS 100 according to an embodiment determines a state of deviation from a control condition for a lane following assist due to a lane disappearing. FIG. 10 is a diagram illustrating an example where the DAS 100 according to an embodiment determines as a collision risk state. FIG. 11 is a diagram illustrating an example where the DAS 100 according to an embodiment determines as an unsuitable state for assistance due to a lane change of a preceding vehicle. FIG. 12 is a diagram illustrating an example where the DAS 100 according to an embodiment determines as an unsuitable state for assistance due to reaching a branching point. FIG. 13 is a diagram illustrating an example where the DAS 100 according to an embodiment determines as an unsuitable state for assistance due to reaching a joining point.

Referring to FIG. 9, the processor 131 may determine as a state of deviation from a control condition for lane following assist, when lanes 400 (400a and 400b) disappear while performing the lane following assist by identifying the lanes 400. That is, when the vehicle 1 enters into a lane disappearing section while performing the lane following assist by identifying the lanes 400 (400a and 400b), the processor 131 may determine as the state of deviation from the control condition for lane following assist, and also when a driver's operation of the steering device 40 is not detected, transmit a warning signal to immediately output a higher level (second) warning.

Also, the processor 131 may determine a relative location to a nearby object (e.g., other vehicles, pedestrians, cyclists, etc.) based on at least one of image data or radar data, and determine as a collision risk state when a risk of collision with the nearby object exists based on the relative location to the nearby object. That is, the processor 131 may calculate a time to collision (TTC) or a distance to collision (DTC) with the nearby object based on at least one of the image data or the radar data, and determine whether the risk of collision exists through comparison with a reference value.

As shown in FIG. 10, for example, when a collision with another vehicle 3 is predicted due to a lane change of the preceding vehicle 2 while performing the lane following assist by following the preceding vehicle 2, the processor 131 may determine as the collision risk state.

Also, as shown in FIG. 11, when the preceding vehicle 2 changes lanes while performing the lane following assist by following the preceding vehicle 2, the processor 131 may determine as the unsuitable state for assistance. That is, when the preceding vehicle 2 turns more than a preset angle, the processor 131 may determine that the preceding vehicle 2 changes lanes, determine as the state of deviation from the control condition for lane following assist or the collision risk state with the preceding vehicle 2 due to the lane change of the preceding vehicle 2, and determine as the unsuitable state for assistance.

In addition, as shown in FIG. 12, when the vehicle 1 reaches a branching point where a lane width I is widened while performing the lane following assist by identifying the lane, the processor 131 may determine as the state of deviation from the control condition for lane following assist or the collision risk state, and determine as the unsuitable state for assistance. That is, when the vehicle 1 reaches the branching point, the processor 131 may determine that the lane following assist that follows the lane may not be performed or that a risk of collision with another vehicle may increase, thereby may determine as the unsuitable state for assistance.

Specifically, when the lane width (lane spacing) I reaches a first preset value, the processor 131 may determine that the vehicle 1 reaches the branching point, i.e., a critical point in a branching section. In this instance, the processor 131 may determine as the state of deviation from the control condition for lane following assist or the collision risk state, thereby may determine as the unsuitable state for assistance.

Further, as shown in FIG. 13, when the vehicle 1 reaches a joining point where a lane width I becomes narrow while performing the lane following assist by identifying the lane, the processor 131 may determine as the state of deviation from the control condition for lane following assist or the collision risk state, and determine as the unsuitable state for assistance. That is, when the vehicle 1 reaches the joining point, the processor 131 may determine that the lane following assist that follows the lane may not be performed or that a risk of collision with another vehicle may increase, thereby may determine as the unsuitable state for assistance.

Specifically, when the lane width (lane spacing) I reaches a second preset value, the processor 131 may determine that the vehicle 1 reaches the joining point, i.e., a critical point in a joining section. In this instance, the processor 131 may determine as the state of deviation from the control condition for lane following assist or the collision risk state, thereby may determine as the unsuitable state for assistance.

Hereinafter, a control method of the DAS 100 according to an embodiment is described. The above-described DAS 100 is applicable to the control method of the DAS 100 described below. Accordingly, the above description with reference to FIGS. 1 to 13 is equally applicable to the control method of the DAS 100 according to an embodiment.

Figure 14:
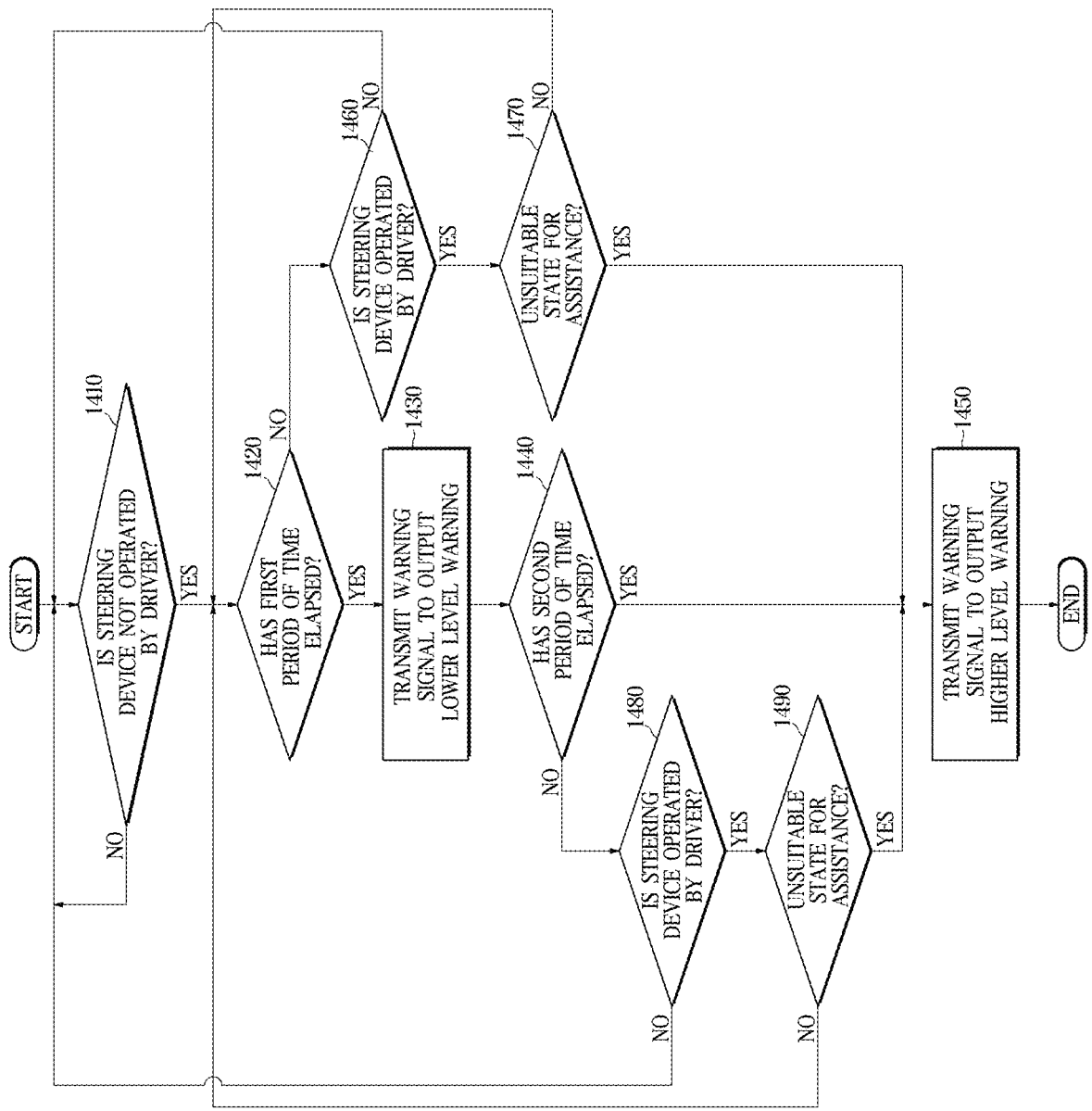
FIG. 14 is a flowchart illustrating a method of outputting a warning by a driver assistance system according to an embodiment while a lane following assist is performed.

FIG. 14 is a flowchart illustrating a method of outputting a warning by the DAS 100 according to an embodiment while a lane following assist is performed.

Referring to FIG. 14, according to an embodiment, when the steering device 40 is not operated by a driver (Yes in operation 1410) and a first period of time elapses (Yes in operation 1420), the DAS 100 may transmit a first warning signal to the vehicle 1 to output a lower level (first) warning (1430).

Also, according to an embodiment, when a second period of time elapses after the output of the lower level warning (Yes in operation 1440), the DAS 100 may transmit a second warning signal to the vehicle 1 to output a higher level (second) warning (1450).

The processor 131 may determine a steering angle and a steering angle change speed of the steering device 40 based on an output of the steering angle sensor 61. When each of the steering angle and the steering angle change speed is maintained within a preset range for a preset period of time, the processor 131 may determine as a hands-off state where the driver's operation of the steering device 40 is not detected.

The processor 131 may adjust a setting range corresponding to each of the steering angle and the steering angle change speed of the steering device 40 based on a steering signal for lane following assist. That is, the processor 131 may set a range for determining the driver's operation based on the steering angle and the steering angle change speed by the steering signal.

The lower level warning may be a visual warning, and the higher level warning may be at least one of an audible warning or an audiovisual warning. That is, the processor 131 may generate the first warning signal targeted to a display so that the display of the warning system 72 outputs a warning, and generate the second warning signal targeted to a speaker so that the speaker of the warning system 72 outputs a warning. According to embodiments, a signal targeted to the display may be included in the second warning signal.

Also, the DAS 100 may output a warning about the hands-off state in stages with time when the driver's operation of the steering device 40 is not detected, and also when determining as an unsuitable state for assistance based on at least one of image data or radar data, transmit the second warning signal to the vehicle 1 in order to immediately output the higher level (second) warning.

That is, when the driver's operation of the steering device 40 is not detected (No in operation 1460) before an elapse of a first period of time (No in operation 1420) after the determination of the hands-off state and the unsuitable state for assistance is determined (Yes in operation 1470), the DAS 100 may transmit the warning signal to the vehicle 1 in order to immediately output the higher level (second) warning (1450).

Also, when the driver's operation of the steering device 40 is not detected (No in operation 1480) before an elapse of a second period of time (No in operation 1440) after transmitting the warning signal to output the lower level (first) warning (1430) and the unsuitable state for assistance is determined (Yes in operation 1490), the DAS 100 may transmit the warning signal to the vehicle 1 in order to immediately output the higher level (second) warning (1450).

As is apparent from the above, according to the embodiments of the disclosure, the driver assistance system and the control method thereof can output a warning in stages with time when no driver's steering wheel operation is detected while a lane following assist is operated, and immediately output a higher level warning when it is determined that the lane following assist is unsuitable to be performed, thereby reducing the likelihood of an accident.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A driver assistance system, comprising:
a camera provided in a vehicle to have an outside field of view of the vehicle and acquire image data;
a radar provided in the vehicle to have an outside field of sensing of the vehicle and acquire radar data; and
a controller comprising at least one processor configured to process the image data acquired by the camera and the radar data acquired by the radar,
wherein the controller is configured to:
transmit a steering signal to the vehicle for a lane following assist based on at least one of the image data or the radar data,
detect a driver's operation of a steering device based on the steering signal and a steering angle of the steering device,
transmit a warning signal to the vehicle to output a warning when the driver's operation of the steering device is not detected,
determine an unsuitable state for assistance in which the lane following assist is unsuitable based on at least one of the image data or the radar data, and
when the lane following assist is unsuitable, transmit the warning signal to output a higher level warning than the warning outputted when the driver's operation of the steering device is not detected.

2. The driver assistance system of claim 1, wherein the controller is configured to transmit a first warning signal to the vehicle so that when the driver's operation is not detected for a first period of time, a hands-off state is determined and a lower level warning is output, and transmit a second warning signal to the vehicle so that the higher level warning is output when the driver's operation is not detected for a second period of time after outputting the lower level warning.

3. The driver assistance system of claim 2, wherein the lower level warning is a visual warning, and the higher level warning is at least one of an audible warning or an audiovisual warning.

4. The driver assistance system of claim 2, wherein the controller is configured to transmit the warning signal to the vehicle so that the higher level warning is immediately output, when determining as the unsuitable state for assistance before an elapse of the first period of time, or before an elapse of the second period of time after outputting the lower level warning.

5. The driver assistance system of claim 1, wherein the controller is configured to determine as the unsuitable state for assistance, when at least one of a state of deviation from a control condition for the lane following assist or a collision risk state occurs.

6. The driver assistance system of claim 5, wherein the controller is configured to determine as the state of deviation from the control condition for the lane following assist, when a lane disappears while performing the lane following assist by identifying the lane.

7. The driver assistance system of claim 5, wherein the controller is configured to determine as the collision risk state, when a risk of collision with a nearby object exists based on a relative location to the nearby object.

8. The driver assistance system of claim 5, wherein the controller is configured to determine as the unsuitable state for assistance, when a preceding vehicle changes lanes, while performing the lane following assist by following the preceding vehicle.

9. The driver assistance system of claim 5, wherein the controller is configured to determine as the unsuitable state for assistance, when the vehicle reaches a branching point where a lane width is widened while performing the lane following assist by identifying the lane, and
the branching point is a critical point in a branching section where the lane width reaches a preset value.

10. The driver assistance system of claim 1, wherein the controller is configured to determine as the unsuitable state for assistance, when the vehicle reaches a joining point where a lane width becomes narrow while performing the lane following assist by identifying the lane, and
the joining point is a critical point in a joining section where the lane width reaches a preset value.

11. A control method of a driver assistance system comprising a camera provided in a vehicle to have an outside field of view of the vehicle and acquire image data and a radar provided in the vehicle to have an outside field of sensing of the vehicle and acquire radar data, the control method comprising:
transmitting a steering signal to the vehicle for a lane following assist based on at least one of the image data or the radar data;
detecting a driver's operation of a steering device based on the steering signal and a steering angle of the steering device;
transmitting a warning signal to the vehicle to output a warning when the driver's operation is not detected;
determining an unsuitable state for assistance in which the lane following assist is unsuitable based on at least one of the image data or the radar data; and
when the lane following assist is unsuitable, transmitting the warning signal to output a higher level warning than the warning outputted when the driver's operation of the steering device is not detected.

12. The control method of claim 11, wherein the transmitting of the warning signal to the vehicle to output the warning in stages with time when the driver's operation is not detected comprises:
when the driver's operation is not detected for a first period of time, transmitting a first warning signal to the vehicle so that a hands-off state is determined and a lower level warning is output, and
when the driver's operation is not detected for a second period of time after outputting the lower level warning, transmitting a second warning signal to the vehicle so that the higher level warning is output.

13. The control method of claim 12, wherein the lower level warning is a visual warning, and the higher level warning is at least one of an audible warning or an audio-visual warning.

14. The control method of claim 12, wherein the transmitting of the warning signal to the vehicle to output the higher level warning comprises transmitting the warning signal to the vehicle so that the higher level warning is immediately output, when determining as the unsuitable state for assistance before an elapse of the first period of time, or before an elapse of the second period of time after outputting the lower level warning.

15. The control method of claim 11, wherein the determining as the unsuitable state for assistance comprises determining as the unsuitable state for assistance, when at least one of a state of deviation from a control condition for the lane following assist or a collision risk state occurs.

16. The control method of claim 15, wherein the determining as the unsuitable state for assistance comprises determining as the state of deviation from the control condition for the lane following assist, when a lane disappears while performing the lane following assist by identifying the lane.

17. The control method of claim 15, wherein the determining as the unsuitable state for assistance comprises determining as the collision risk state, when a risk of collision with a nearby object exists based on a relative location to the nearby object.

18. The control method of claim 15, wherein the determining as the unsuitable state for assistance comprises determining as the unsuitable state for assistance, when a preceding vehicle changes lanes, while performing the lane following assist by following the preceding vehicle.

19. The control method of claim 15, wherein the determining as the unsuitable state for assistance comprises determining as the unsuitable state for assistance, when the vehicle reaches a branching point where a lane width is widened while performing the lane following assist by identifying the lane, and
the branching point is a critical point in a branching section where the lane width reaches a preset value.

20. The control method of claim 11, wherein the determining as the unsuitable state for assistance comprises determining as the unsuitable state for assistance, when the vehicle reaches a joining point where a lane width becomes narrow while performing the lane following assist by identifying the lane, and
the joining point is a critical point in a joining section where the lane width reaches a preset value.

* * * * *